United States Patent [19]

Gonze et al.

[11] Patent Number: 5,711,975
[45] Date of Patent: Jan. 27, 1998

[54] STARCH COMPOSITION FOR SUGAR-FREE CONFECTIONERY

[75] Inventors: Michel Henri André Gonze, Brussels; Freddy Maurits Luc Van Der Schueren, Aalst; Jozef Frans Victor Goossens, Korbeek-lo, all of Belgium

[73] Assignee: Cerestar Holding B.V., Netherlands

[21] Appl. No.: 610,958

[22] Filed: Mar. 5, 1996

[30] Foreign Application Priority Data

Mar. 9, 1995 [GB] United Kingdom ............... 9504732

[51] Int. Cl.$^6$ ...................................................... A23L 1/09
[52] U.S. Cl. ................... 426/3; 426/548; 426/658
[58] Field of Search ........................ 426/549, 576, 426/657, 660, 661, 3, 548, 658

[56] References Cited

U.S. PATENT DOCUMENTS

| | | | |
|---|---|---|---|
| 4,192,900 | 3/1980 | Cheng | 426/579 |
| 4,238,510 | 12/1980 | Cherukuri et al. | 426/5 |
| 4,250,195 | 2/1981 | Cherukuri et al. | 426/5 |
| 4,251,560 | 2/1981 | Dell et al. | 426/565 |

FOREIGN PATENT DOCUMENTS

| | | |
|---|---|---|
| 0 109 776 | 5/1984 | European Pat. Off. . |
| 0 273 000 | 6/1988 | European Pat. Off. . |
| 0 273 856 | 7/1988 | European Pat. Off. . |
| 0 366 251 | 5/1990 | European Pat. Off. . |
| 0 609 983 | 8/1994 | European Pat. Off. . |

OTHER PUBLICATIONS

Cerestar Manufacturing Technical Information on Maltide™ 16311.

*Primary Examiner*—Thomas R. Weber
*Attorney, Agent, or Firm*—Cushman Darby & Cushman Intellectual Property Group of Pillsbury Madison & Sutro LLP

[57] ABSTRACT

The present invention discloses a starch-based composition suitable for use as a basis for sugar-free confectionery products. The composition of the present invention comprises thinned, hydropropyl tapioca starch, gelatin and a suitable polyol. The components of the composition are present in such amounts that the pH of dental plaque does not fall below 5.7 after consumption of the sugar-free confectionery product containing the indicated components.

12 Claims, No Drawings

STARCH COMPOSITION FOR SUGAR-FREE CONFECTIONERY

The present invention relates to a starch containing composition and in particular to a composition which is suitable for use in producing sugar-free confectionery products.

Confectionery products such as gums and pastilles require a starch or gum arabic base. To date starch gums have not been used in the production of sugar-free confectionery products as no starch derivatives were available which could be classified as 'safe for teeth' in the appropriate tests. As for the gum arabic based confectionery products, due to the interesting texture and other characteristics it has been difficult to replace this component in every one of its applications, in spite of the clear felt need to do so.

Gum arabic is the dried exudate obtained from various species of trees of the genus Acacia of the Leguminosae family which are found in the tropical and semi-tropical areas of the world. The most important producing areas are the Republic of the Sudan and some of the countries in West Africa.

Gum arabic is extensively used, particularly in the food industry e.g. as the base for gum-containing confectionery products such as pastilles. In such applications gum arabic is difficult to replace and hence it is important that there should be a guarantee of supply of good quality product in sufficient quantity.

In our U.S. Pat. No. 5,208,061 we have described and claimed a composition which is suitable: for use as a replacement for gum arabic in certain applications, particularly in the production of gums and pastilles. The composition described in the U.S. patent comprises a mixture of art extruded waxy starch, a low DE maltodextrin and enzymatically hydrolysed collagen. The mixture may be agglomerated and preferably comprises 60 to 80% by weight of the composition extruded waxy starch, 12 to 25% maltodextrin, and 8 to 15% enzymatically hydrolysed collagen. In particular the composition may comprise 70 to 72% extruded waxy starch, 17 to 19% maltodextrin and 10 to 12% enzymatically hydrolysed collagen.

In a currently pending non-prepublished patent application we describe and claim another composition which can suitably be employed as a gum arabic replacement. This composition comprises a thinned, hydroxypropyl tapioca starch and an enzymatically hydrolysed collagen.

EP-A-609 983 describes starch compositions suitable for producing biodegradable products. The compositions cannot be applied in food applications.

EP-A-109 776 describes a process for producing hydroxypropyl starches. The starches described in this patent application are found to have a reduced pasting temperature. There is no mention of the use of these or similar starches in sugar-free food products.

EP-A-273 000 and EP-A-273 856 describes xylitol and sorbitol coated comestibles and method of preparation thereof. The compositions describes in these patent applications do not qualify as 'Safe for teeth', nor can they be used as gum arabic replacements as they give rise to a completely different texture. The compositions are used as coatings which are hard and crunchy.

Gum arabic is also used as a bulk substance in sugar-free gum types i.e. fruit and liquorice types and pastilles like throat pastilles. It would be of commercial interest to replace gum arabic with a modified starch in sugar-free confectionery applications. Linstrom et at. (Scand. J. Dent. Res. 1991.99: 30–39) have studied the effects of chemically modified starches in suspensions and lozenges on pH of human dental plaque.

Out of six chemically modified starches (CMS) two were selected for in vitro tests. These were Capsul™ (sodium-1-octenyl succinate of waxy maize starch, cold-water swelling) and Purity Gum 40™ (hydroxypropylated tapioca starch, warm-water swelling). The authors concluded that it is not recommended to exchange gum arabic for CMS in sugar-free lozenges, since the cariogenic properties of the products are negatively affected by a such an exchange.

Although starch-based gum arabic replacers are therefore known it has not been possible to date to replace gum arabic with starch-based compositions in sugar-free confectionery while maintaining at the same time the cariogenic properties of gum arabic.

At the same time it has not been possible to replace starch in starch gums by a 'sugar-free' starch derivative.

The present invention discloses a starch-based composition suitable for use as a basis for sugar-free confectionery products such as gums and pastilles. Variation of the amounts of the different components of the composition gives products with a different texture therefore the composition can also be used to replace gum arabic.

The present invention therefore also discloses a starch-based gum arabic replacement suitable for use in sugar-free confectionery products. The compositions of the present invention are qualified as 'Safe for teeth'.

The present invention also describes a method for obtaining sugar-free confectionery products comprising the addition of a mixture of a thinned, hydroxypropyl tapioca starch, gelatin and a polyol.

According to the present invention a composition suitable for use as a base for sugar-free confectionery products comprises a mixture of a thinned, hydroxypropyl tapioca starch, gelatin and a polyol.

Gelatin is obtained by the chemical hydrolysis of collagen and is different from enzymatically hydrolysed collagen which can be obtained commercially. Gelatin is mixed with tapioca starch in the range of from 0.5 to 5% by weight, preferably 2% by weight.

The hydroxypropyl tapioca starch component of the composition according to the invention may have a DS (degree of substitution) in the range 0.05 to 0.2, preferably 0.08 to 0.15 particularly 0.1 to 0.12. It is also possible, although not necessary, for substituents other than hydroxypropyl to be present in the starch molecule e.g. acetate groups. The hydroxypropyl tapioca starch is "thinned" in order to reduce its viscosity in aqueous media. Thinning may be achieved in a known manner by acid treatment, by enzyme treatment, or by extrusion, with or without the addition of acid. Suitably, the hydroxypropyl tapioca starch is thinned so that a 30% by weight aqueous mixture has a Brabender peak viscosity of about 150 Brabender Units. The thinned, hydroxypropyl tapioca starch may be ungelatinised as when acid thinned or gelatinised as when enzymatically thinned. In the latter case the thinned starch may be spray-dried.

As mentioned above the compositions of the present invention can be used to make sugar-free confectionery product such as gums and pastilles.

In the compositions according to the present invention gum arabic is replaced by the chemically modified starch of the present invention in an mount of from 15% to 60% by weight of the starch used for replacing the gum arabic. Preferably the hydroxypropylated starch forms about 33% of the mixture.

As indicated above the gum arabic is replaced with a chemically modified starch, gelatin and a polyol. Suitable polyols are sorbitol and maltitol. The chemically modified starch is for example combined with a maltitol syrup containing 30 to 85% maititol, preferably 75% maltitol by weight of the mixture (MALTIDEX™ M16311 syrup is a suitable example).

The composition according to the invention is of particular use in the production of sugar-free pastilles and gums. Such gums may be prepared as follows. 10 to 65% of hydroxypropylated starch containing 2% of gelatin is mixed with 90 to 35% of maltitol syrup. The modified starch and maltitol syrup are mixed in water, 5 to 50% by weight, preferably 11% (see examples). The mixture is heated to about 70° C. The mixture is further cooked up in an open pan, other suitable cookers such as a jet cooker or a tubular cooker may also be employed. The mixture is heated until the water content is from 60 to 80% by weight, preferably 69% by weight. Citric acid, flavour and colour are added or injected as desired. The mixture is finally run into starch molds where it is allowed to solidify. This process provides a soft to hard gum type containing 6 to 18% by weight of the gum of water.

The results of the evaluation in vitro (enzymatic test) and a more specific test for measurements of pH change in human dental plaque in vivo (Muhlemann test) showed that gum arabic can be replaced by the hydroxypropylated tapioca starch, gelatin, polyol mixture of the present invention in sugar-free confectionery gums and pastilles. The hydroxypropylated tapioca starch effected the same positive cariogenic properties as gum arabic. In vivo the pH values of dental plaque did not fall below the critical value (5.7) for the onset of caries. In terms of the performed tests the composition can be qualified as 'Safe for teeth'. It should be noted that this is the first time that a starch-based composition is qualified as 'Safe for teeth'. This inventions opens up a complete new field of applications for starch. The starch-based compositions of the present invention are used to replace gum arabic, the compositions are also used to replace starch. In both instances the the products are classified as 'Safe for teeth'.

The compositions made with the indicated gum arabic replacers are non-sticky products with a gum arabic texture and bland taste.

The invention will now be further described with reference to the following Examples.

EXAMPLES

A starch composition was prepared containing the ingredients shown below. The starch was acid thinned, hydroxypropyl tapioca starch having a DS of 0.1 and a Brabender peak viscosity of 150 Brabender Units when measured as a 30% by weight aqueous mixture. This starch was mixed with 2% gelatin by weight.

The composition was evaluated in comparison with gum arabic in a gum prepared using the method described earlier in this specification. The gum compositions and the results of the evaluation are presented in the following Table.

| Composition % w/w | A | B |
|---|---|---|
| gum arabic | — | 33 |
| H.P. tapioca starch (containing 2% gelatin) | 33 | — |
| Maltidex ™ 100 | 56 | 56 |
| Water | 11 | 11 |
| Citric acid solution (50% w/w, % added with respect to mixture) | 2 | 2 |
| Colouring solution | a.d. | a.d. |
| Flavour | a.d. | a.d. |
| Cooking temperature °C. | 122 | 122 |
| Moisture content % w/w | 10 | 10 | a.d. = after drying

The pH in the dental plaque as measured on different persons after consumption of composition A did not fall below 5.7 in the so-called Muhlemann test (Graf and Muhlemann, J. Dent. Res. 1965. 44:1039, and Helv. Odom. Acta. 1966. 10: 94, Muhlemann, J. Clin. Periodontol. 1979. 6 extra issue 7:47). The composition can therefore be considered as 'safe-for-teeth'.

We claim:

1. A composition suitable for use as a basis for sugar-free confectionery products which comprises a mixture of a thinned, hydroxypropyl tapioca starch, gelatin and a polyol.

2. The composition according to claim 1 wherein said composition comprises:

10% to 65% by weight of said mixture of thinned, hydroxypropyl tapioca starch containing 2% by weight of gelatin and 90 to 35% by weight of a maltitol syrup containing 30 to 85% maltitol by weight.

3. The composition according to claim 2 wherein said composition comprises:

33% by weight of said composition of thinned, hydroxypropyl tapioca starch containing 2% by weight of gelatin and 56% by weight of said maltitol syrup containing 75% maltitol by weight.

4. The composition according to claim 1 wherein said thinned, hydroxypropyl tapioca starch is ungelatinized.

5. The composition according to claim 1 wherein said thinned, hydroxypropyl tapioca starch has a DS of 0.05 to 0.2.

6. The composition according to claim 1 wherein said thinned, hydroxypropyl tapioca starch has a DS of 0.08 to 0.15.

7. The composition according to claim 1 wherein said thinned, hydroxypropyl tapioca starch has a DS of 0.1 to 0.12.

8. The composition according to claim 1 wherein said thinned, hydroxypropyl tapioca starch comprises a 30% by weight aqueous solution having a Brabender viscosity of about 150 Brabender Units.

9. A sugar-free confectionery product which comprises:

a mixture of a thinned, hydroxypropyl tapioca starch, gelatin and a polyol.

10. The sugar-free confectionery product according to claim 9 wherein said mixture is combined in such proportions to cause in vivo pH values of dental plaque to not fall below pH 5.7 when said mixture is applied to the teeth of a subject.

11. A sugar-free gum product which comprises:

10 to 65% by weight of said mixture of thinned, hydroxypropyl tapioca starch containing 2% by weight of gelatin and 90 to 35% by weight of a maltitol syrup containing 30 to 85% maltitol by weight.

12. A method for preparing sugar free confectionery products comprising:

providing a thinned, hydroxypropyl tapioca starch;

providing a gelatin;

providing a polyol, and forming a composition using said thinned, hydroxypropyl tapioca starch, said gelatin and said polyol.

* * * * *